United States Patent [19]

Conte

[11] Patent Number: 5,454,676
[45] Date of Patent: Oct. 3, 1995

[54] SAFETY SCREW PARTICULARLY FOR SKATES

[75] Inventor: Gino Conte, Caerano S. Marco, Italy

[73] Assignee: Roces S.r.l., Montebelluna, Italy

[21] Appl. No.: 196,037

[22] Filed: Feb. 10, 1994

[30] Foreign Application Priority Data

Apr. 22, 1993 [IT] Italy .................................. TV93U0021

[51] Int. Cl.⁶ ............................. F16B 21/00; F16B 23/00; F16B 35/06
[52] U.S. Cl. .......................... 411/339; 411/366; 411/399; 411/947
[58] Field of Search ...................... 411/324, 338, 411/339, 366, 399, 947

[56] References Cited

U.S. PATENT DOCUMENTS

| | | | |
|---|---|---|---|
| 910,678 | 1/1909 | Hardin | 411/324 |
| 1,150,114 | 8/1915 | Hays | 411/338 X |
| 1,849,069 | 3/1932 | Bridges | 411/324 X |
| 1,909,941 | 5/1933 | Finch | 411/338 |
| 1,936,769 | 11/1933 | Olivet | 411/399 X |
| 2,511,051 | 6/1950 | Dzus | 411/338 X |
| 4,033,243 | 7/1977 | Kirrish et al. | 411/338 |

FOREIGN PATENT DOCUMENTS 838154  6/1960  United Kingdom .................. 411/339

*Primary Examiner*—Neill R. Wilson
*Attorney, Agent, or Firm*—R. Neil Sudol; Henry D. Coleman

[57] ABSTRACT

A safety screw for skates, including a male part, provided with a first head and with a first internally threaded stem, and a female part, provided with a second head and with a second stem that has a complementarily threaded first seat for the first stem. In this screw, the male part has an axial external reeding which is adjacent to the first head and has a slightly larger diameter than the first stem. The reeding interacts with a second seat that has a slightly smaller diameter. The second seat is formed at the free end of the female part, and is contiguous to the first seat.

9 Claims, 1 Drawing Sheet

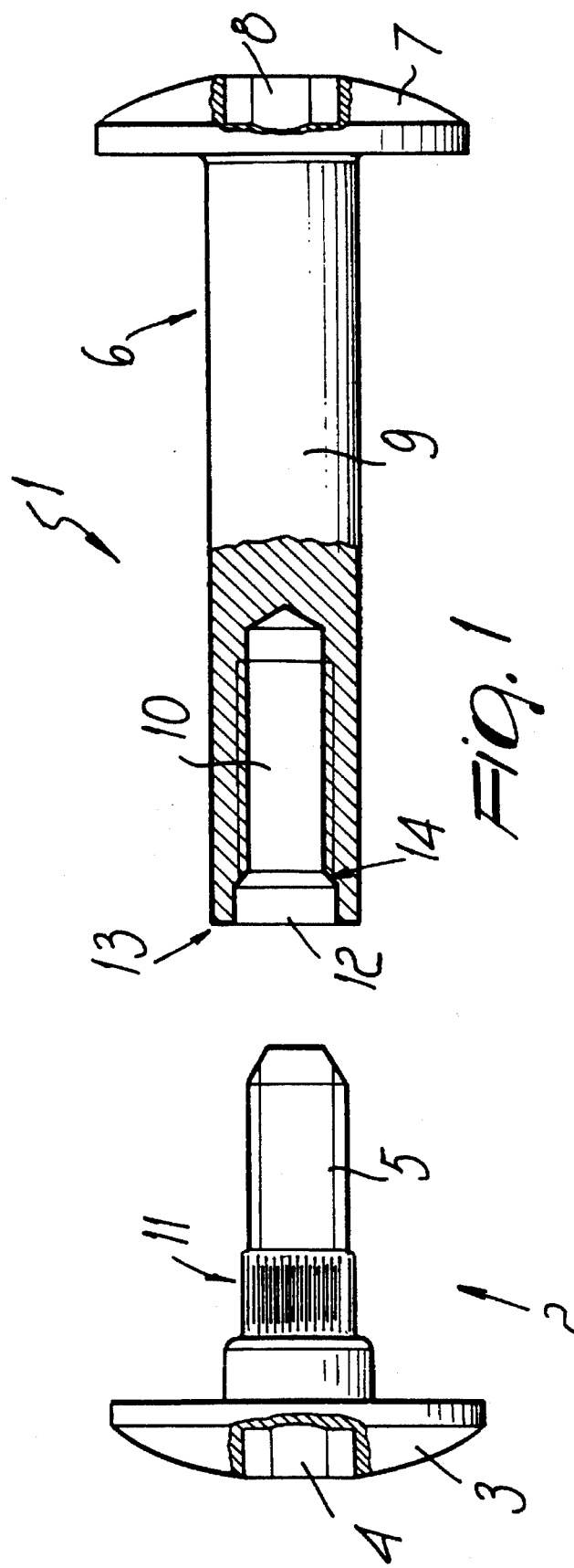

5,454,676

SAFETY SCREW PARTICULARLY FOR SKATES

BACKGROUND OF THE INVENTION

1. Field of the Invention

The present invention relates to a safety screw particularly usable for skates with aligned wheels.

2. Description of the Prior Art

In conventional skates the wheels are associated at a pivot which is constituted by a male part, and by a female part. The male part has a head and a first internally threaded stem. The female part has a second head and a second stem that has a complementarily threaded first seat for the first stem. The male part and the female parts are screwed together for coupling the wheel.

However, there is the problem that, during use, the vibrations applied to the frame of the skate, on which the male and female parts are associated, cause these parts to unscrew.

The aim of the present invention is to solve the described drawback by providing a screw that allows to achieve optimum and stable securing between a male part and a female part.

An additional object is to provide a screw in which it is nonetheless possible to mutually disengage the male and female parts.

Another important object is to provide a screw that is simple and easy to industrialize.

Another object is to provide a screw that has very low manufacturing costs allowing its widespread use.

SUMMARY OF THE INVENTION

This aim, these objects and others which will become apparent from the description that follows are achieved by a safety screw, particularly usable for skates, comprising a male part and a female part, said male part having a first head and a first externally threaded stem, said female part having a second head and a second stem, said second stem having a complementarily threaded first seat for said first stem, said male part having an external reeding adjacent to said first head, said external reeding having a slightly larger diameter than said first stem, said reeding interacting with a second seat having a slightly smaller diameter, said second seat being formed at the free end of said female part, and being contiguous to said first seat.

Other objects will become apparent during the description that follows, which must be considered in combination with the accompanying drawings, illustrating a particular embodiment by way of non-limitative example.

BRIEF DESCRIPTION OF THE DRAWINGS

FIG. 1 is a partially sectional exploded view of the screw;

FIG. 2 is a detail view of a portion of the female part.

DESCRIPTION OF THE PREFERRED EMBODIMENTS OF THE INVENTION

With reference to the figures, and taking into account that they are merely examples of a particular embodiment and are in different scales, and that identical or equivalent parts are designated by the same individual reference numerals, the numeral 1 designates the safety screw, which is particularly usable for ice skates or roller skates.

The screw is composed of a first externally threaded stem 5 and of a male part 2 which has a first head 3. A first seat 4, for a tool such as an Allen wrench or a screwdriver, is formed on the first head 3.

The screw 1 also includes a female part 6 having a second head 7 and a second stem 9. The second head 7 has a second seat 8 for a tool, and the second stem 9 has a complementarily threaded first seat 10 for the first stem 5 of the male part 2.

The male part has, at the first stem 5, an external reeding 11 which is preferably formed axially with respect to the first stem and is adjacent to the first head 3.

This reeding 11, which is essentially constituted by a plurality of serrations arranged approximately parallel to one another, has a slightly larger outer diameter than the first stem 5 and can interact with a second seat 12 that has a slightly smaller diameter and is formed at the free end 13 of the female part 6.

The second seat 12 is contiguous to the first seat 10, and the two seats are blended along a conical flaring 14.

The safety screw is used as follows: once the first stem 5 of the male part 2 has been associated at the first seat 10 formed in the female part 6, and once these parts have been screwed together, the reeding 11 interacts at the second seat 12 or, as an alternative, with the conical flaring 14.

By forcing the rotation of the female part or of the male part with a tool, the parts are mutually secured by virtue of the deformation that the reeding causes at the lateral surface of the second seat 12 or at the conical flaring 14 due to the different diameters.

The vibrations applied to the safety screw, for example during use of a skate in which the screw acts as pivot for the wheels, do not cause the loosening of the male and female parts by virtue of the axial arrangement of the reeding.

In any case it is possible to mutually disengage the parts and recouple them in safe conditions by forcing their mutual rotation with a tool.

It has thus been observed that the screw has achieved the intended aim and objects allows to achieve an optimum securing between the male and female parts which is stable during use of the skate.

The screw also allows the user to mutually disengage the male and female parts and to subsequently restore an optimum mutual securing.

The reeding 11 may also lie along one or more axes which are inclined with respect to the axis of the main stem 5.

As an alternative, the reeding may be constituted by a knurled surface or otherwise by a surface that has one or more protrusions that rise from the outer lateral surface of the thread of the first stem 5.

Naturally, the materials that form the individual components of the screw and the dimensions of the components may vary according to several requirements.

I claim:

1. A safety screw, particularly for skates, comprising a male part and a female part, said male part having a first head and an externally threaded first stem, said female part having a second head and a second stem, said second stem having a complementarily threaded first seat for said first stem, said male part having an external reeding adjacent to said first head, said external reeding having a slightly larger diameter than said first stem, said reeding interacting with a second seat having a slightly smaller diameter than said external reeding, said second seat being formed at a free end of said female part and being contiguous to said first seat.

2. A screw according to claim 1 wherein said male part has said external reeding at said first stem, said external reeding being axially arranged at said first stem.

3. A screw according to claim 1 wherein said second seat is blended to said first seat along a conical flaring.

4. A screw according to claim 1 wherein said reeding is constituted by a surface that has a plurality of protrusions that rise with respect to an outer lateral surface of a thread of said first stem.

5. A safety screw, particularly for skates, comprising a male part and a female part, said male part having a first head and an externally threaded first stem, said female part having a second head and a second stem, said second stem having a complementarily threaded first seat for said first stem, said male part having an external reeding adjacent to said first head, said external reeding having a slightly larger diameter than said first stem, said reeding interacting with a second seat having a slightly smaller diameter than said external reeding, said second seat being formed at a free end of said female part and being contiguous to said first seat, said second seat being blended to said first seat along a conical flaring.

6. A safety screw, particularly for skates, comprising:

a male part having a first head and an externally threaded first stem, said male part being provided with an external reeding adjacent to said first head, said external reeding having a slightly larger diameter than said first stem; and a female part having a second head and a second stem, said second stem having an internally threaded substantially cylindrical first seat receiving said first stem, said female part having a substantially cylindrical second seat having a slightly smaller diameter than said external reeding and a larger diameter than said first seat, said second seat being formed at a free end of said female part and being contiguous to said first seat, said second seat receiving said external reeding of said male part.

7. A screw according to claim 6 wherein said male part has said external reeding at said first stem, said external reeding being axially arranged at said first stem.

8. A screw according to claim 6 wherein said second seat is blended to said first seat along a conical flaring.

9. A screw according to claim 6 wherein said reeding is constituted by a surface that has a plurality of protrusions that rise with respect to an outer lateral surface of a thread of said first stem.

\* \* \* \* \*